United States Patent
Alecu (10) Patent No.: US 12,510,249 B2
(45) Date of Patent: Dec. 30, 2025

(54) AUXILIARY POWER UNIT WITH PULSE DETONATION COMBUSTION

(71) Applicant: Pratt & Whitney Canada Corp., Longueuil (CA)

(72) Inventor: Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/337,816

(22) Filed: Jun. 20, 2023

(65) Prior Publication Data
US 2024/0426482 A1    Dec. 26, 2024

(51) Int. Cl.
*F23R 7/00*    (2006.01)
*F02C 5/10*    (2006.01)

(52) U.S. Cl.
CPC .................. *F23R 7/00* (2013.01); *F02C 5/10* (2013.01); *F05D 2220/50* (2013.01)

(58) Field of Classification Search
CPC ........... F23R 7/00; F02C 5/10; F05D 2220/50
See application file for complete search history.

(56) References Cited

U.S. PATENT DOCUMENTS

| | | | | |
|---|---|---|---|---|
| 2,543,758 A * | 3/1951 | Bodine, Jr. | ............... | F02K 7/02 60/39.77 |
| 2,593,523 A * | 4/1952 | Bauger | ..................... | F02C 5/10 60/39.38 |
| 2,731,795 A * | 1/1956 | Bodine, Jr. | ............... | F02K 7/04 60/233 |
| 2,748,564 A * | 6/1956 | Marchal | .................... | F02C 5/11 60/39.38 |
| 3,035,413 A * | 5/1962 | Linderoth | ................. | F02K 7/02 60/248 |
| 4,175,380 A | 11/1979 | Baycura | | |
| 6,901,738 B2 * | 6/2005 | Sammann | ................. | F02C 3/16 60/39.38 |
| 7,047,724 B2 * | 5/2006 | Nordeen | ................. | F02C 3/165 60/39.38 |
| 7,784,265 B2 | 8/2010 | Rasheed et al. | | |
| 8,683,780 B2 | 4/2014 | Shimo et al. | | |
| 9,027,324 B2 | 5/2015 | Snyder | | |
| 2005/0284127 A1 | 12/2005 | Tobita et al. | | |
| 2006/0254252 A1 * | 11/2006 | Rasheed | ................... | F23R 7/00 60/39.38 |

(Continued)

FOREIGN PATENT DOCUMENTS

CH    233945 A    8/1944

OTHER PUBLICATIONS

Extended European Search Report for European Application No. 24183348.2 mailed Nov. 6, 2024.

*Primary Examiner* — Ted Kim
(74) *Attorney, Agent, or Firm* — Carlson, Gaskey & Olds, P.C.

(57) ABSTRACT

An accessory power unit assembly includes a combustor assembly that includes a pulse detonation tube that defines a curved passage between an inlet that receives a compressed airflow and a discharge end. The detonation tube operates as a resonant cavity to sustain a standing pressure wave. Fuel injected into the pulse detonation tube is timed to coincide with movement of a standing wave toward a discharge end. The standing wave provides an increase in pressure of an output exhaust gas driving the turbine without a corresponding increase in load.

16 Claims, 4 Drawing Sheets

(56) References Cited

U.S. PATENT DOCUMENTS

| | | | |
|---|---|---|---|
| 2009/0266047 A1* | 10/2009 | Kenyon | F23R 7/00 60/39.76 |
| 2016/0194087 A1* | 7/2016 | Nalim | F02C 5/04 903/930 |
| 2020/0149743 A1* | 5/2020 | Singh | F23R 3/50 |

* cited by examiner

AUXILIARY POWER UNIT WITH PULSE DETONATION COMBUSTION

TECHNICAL FIELD

The present disclosure relates generally to an auxiliary power unit that utilizes pulse detonation combustion tubes for improved power and fuel efficiency.

BACKGROUND

An auxiliary power unit (APU) provides power to operate accessory devices and/or generate electric power independent of the propulsive engines of an aircraft. A conventional APU includes a compressor wheel driven by a turbine. Compressed air from the compressor is mixed with fuel in a combustor and ignited to generate an exhaust gas flow that drives the turbine. The turbine drives the compressor and a load such as generator, pump or other device utilized to operate accessory items and systems. Turbine engine manufacturers continue to seek further improvements to engine performance including improvements to thermal, transfer and fuel efficiencies.

SUMMARY

An accessory power unit assembly according to an exemplary embodiment of this disclosure, among other possible things includes a compressor that is coupled to an engine shaft that is disposed about an engine axis, a combustor assembly that is configured to generate an exhaust gas flow, the combustor assembly includes at least one detonation tube that defines a curved passage between an inlet that receives a compressed airflow and a discharge end. The combustor assembly further includes at least one fuel injector that is configured to inject fuel into the inlet and an igniter for igniting a fuel air mixture within the detonation tube near the discharge end. A turbine is coupled to the engine shaft that is configured to rotate in response to the exhaust gas flow that is communicated from the combustor assembly.

A gas turbine engine according to another exemplary embodiment of this disclosure, among other possible things includes a compressor that is coupled to an engine shaft that is disposed about an engine axis, a diffuser that receives compressed airflow from the compressor, a distribution manifold that receives the compressed airflow from the diffuser. A combustor assembly includes at least three detonation tubes, each of the detonation tubes define a curved passage between an inlet and a discharge end, the inlet includes an outer rounded cross-section and an inner converging/diverging venturi and is orientated transverse to an inlet flow of air such that air flows across the inlet, a fuel injector that is configured to inject fuel into the inlet, and an igniter for igniting a fuel air mixture within the detonation tube near the discharge end. A turbine is coupled to the engine shaft that is configured to rotate in response to an exhaust gas flow that is communicated from the combustor assembly.

A method of operating an auxiliary power unit assembly according to another exemplary embodiment of this disclosure, among other possible things includes generating a standing pressure wave between an inlet and discharge end of a curved detonation tube, measuring a pressure differential between the inlet and a downstream location, injecting a quantity of fuel through the inlet in response to the measured pressure differential indicating a reversal of the standing pressure wave toward the discharge end, igniting a fuel air mixture with an igniter upon reaching a location proximate the discharge end, and discharging an exhaust gas flow through the discharge end to drive a turbine.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
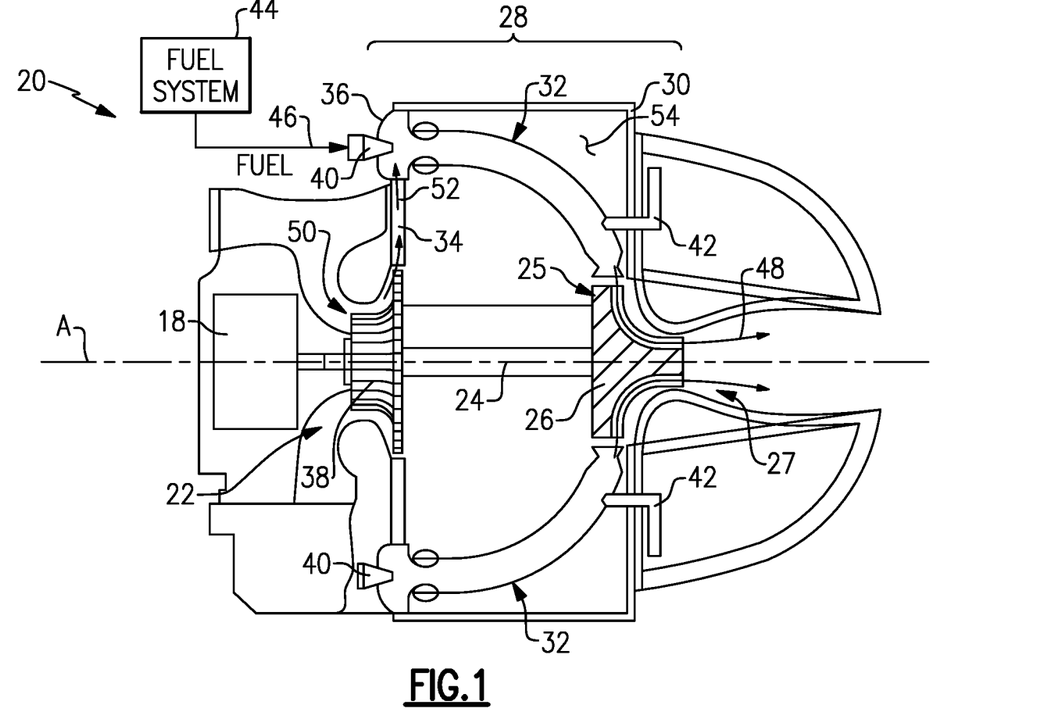
FIG. 1 is a schematic view of an example auxiliary power unit assembly including pulse detonation tubes.

FIG. 1 schematically illustrates an example auxiliary power unit (APU) 20 that includes pulse detonation tubes (PDT) 32 for generating an exhaust gas flow driving a turbine 26. The PDTs 32 operate as a resonant cavity to sustain a standing pressure wave. Fuel is injected into the PDTs 32 is timed to coincide with movement of standing wave toward a discharge end. The standing wave provides an increase in pressure of the output exhaust gas 48 driving the turbine 26 without a corresponding increase in load to provide improved engine operating efficiency.

The example APU 20 is shown schematically as an example gas turbine engine utilizing the disclosed pulse detonated tubes 32. The example APU 20 is illustrated as driving a generator that is schematically shown at 18. However, the APU 20 may be configured to drive pumps, gearboxes or any other accessory component and/or system utilized to support operation of an aircraft or other vehicle. The specific configuration and structure of the APU 20 may differ from the disclosed example and remain with the contemplation of this disclosure. Moreover, use of the disclosed PDTs 32 in other gas turbine engine architectures is also within the scope and contemplation of this disclosure.

The example APU 20 includes a centrifugal compressor section 22 with a compressor impeller 38 coupled to a shaft 24 disposed along an engine axis A. A turbine 26 is also coupled to the shaft 24 and drives the compressor impeller 38. The turbine 26 includes a radial inlet 25 and an axial outlet 27. Inlet airflow 50 is compressed by the compressor impeller 38 and driven radially outward to a manifold 36 through a diffuser 34. The compressed airflow 52 is distributed to each of the PDTs 32 through the manifold 36 and into an inner cavity 54 defined within a combustor housing 30. Two PDTs 32 are shown in FIG. 1; however, any number of PDTs 32 could be utilized within the scope and contemplation of this disclosure.

A fuel system 44 provides a flow of fuel to a fuel injector 40 arranged at the PDT 32. The compressed airflow 52 is mixed with fuel 46 in the PDT 32 and ignited by an igniter 42 at a discharge end of the PDT 32 to generate the exhaust gas flow 48 that expands through the turbine 26.

Figure 2:
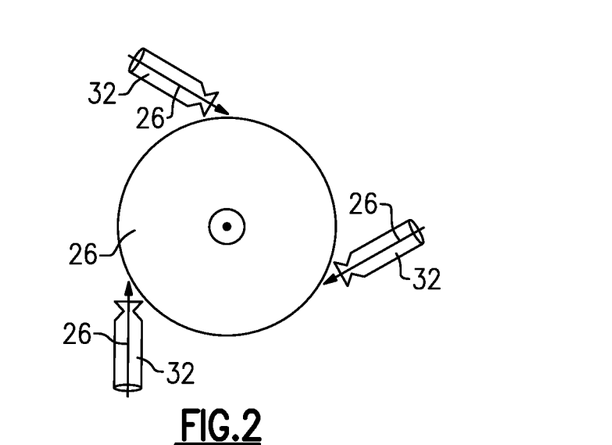
FIG. 2 is an axial schematic view of a pulse detonation tubes arranged tangentially to a turbine.

Referring to FIG. 2 with continued reference to FIG. 1, three PDTs 32 are arranged about the engine axis A and direct exhaust gas flow tangentially to the turbine 26. Although three PDTs 32 are shown by way of example, any number of PDTs may be utilized with the scope and contemplation of this disclosure. Moreover, the PDTs 32 could be operated in a synchronized fashion to provide an even flow of exhaust gas flow 48 to drive the turbine 26.

Figure 3:
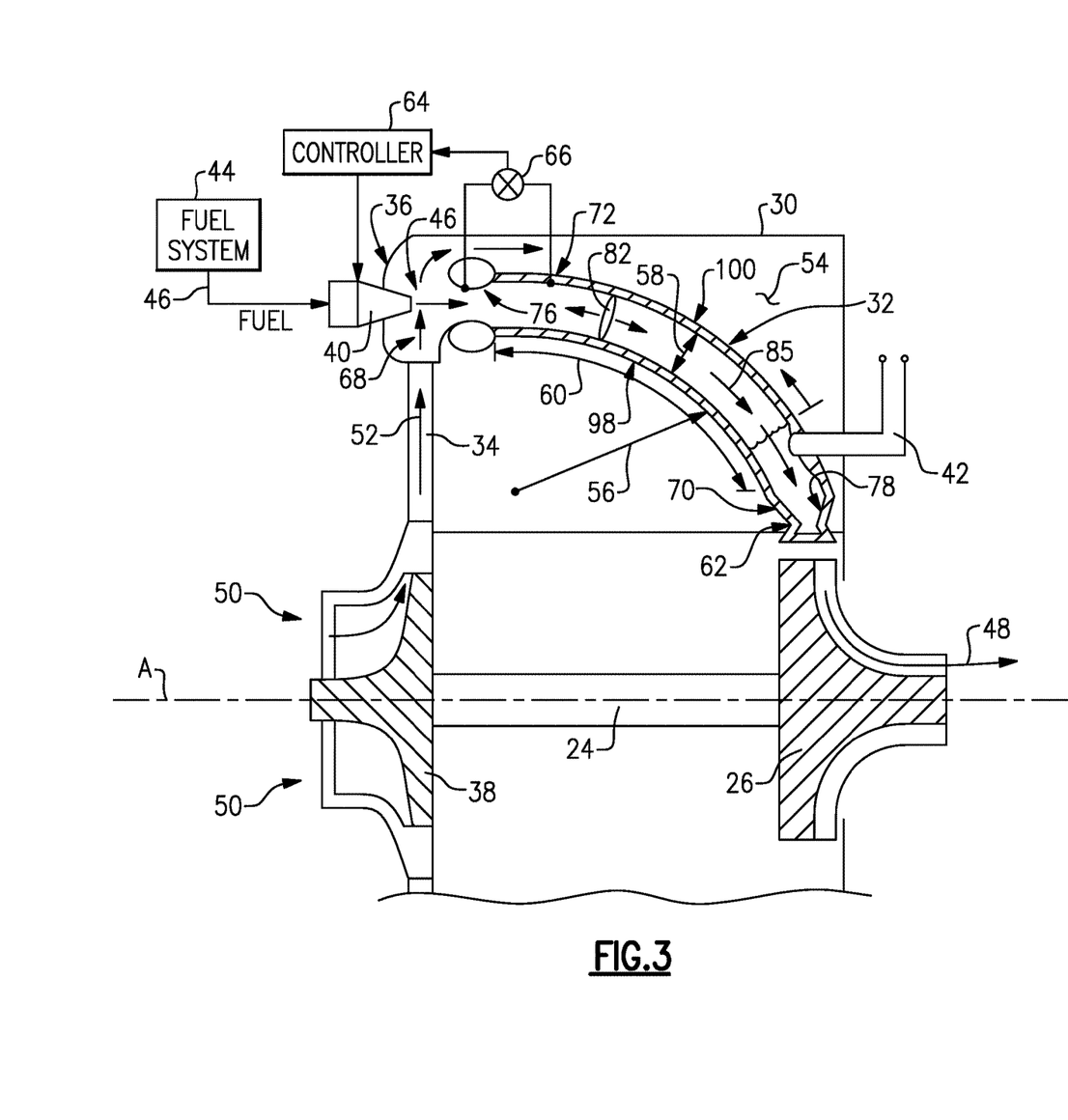
FIG. 3 is a schematic view of an example combustor assembly including a pulse detonation tube.

Referring to FIG. 3, a portion of the example combustor assembly 28 is shown along with an example PDT 32. The PDT 32 includes defines a curved passage between an inlet 68 and a discharge end 70. The inlet end 68 includes an outer thick rounded lip shape in cross-section 74 and an inner convergent-divergent nozzle 76. The discharge end 70 includes an inner convergent-divergent nozzle 78 that forms a turbine nozzle 62.

The PDT 32 includes an inner diameter 58 and is curved at a radius 56 between the inlet 68 and the discharge end 70. The example radius 56 is between two (2) and five (5) times the inner diameter 58. The PDT 32 includes an inner radial surface 98 and an outer radial surface 100. The curved passage defined by the PDT 32 is arranged such that the inlet 68 is disposed radially outward from the discharge end 70. The PDT 32 has a length 60 along the curvature. The length 60 is based on the wavelength of the standing pressure wave 82 generated within the PDT 32. In one example, the length 60 is determined by the formula $L=\lambda/2$, where $\lambda$ is the wavelength.

Figure 4:
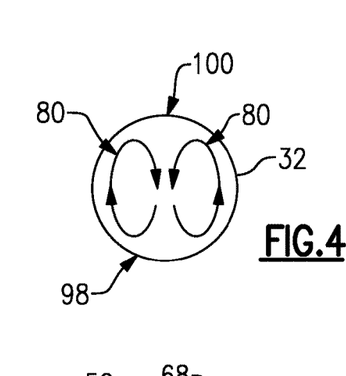
FIG. 4 is a cross-section of a portion of an example pulse detonation tube.

Referring to FIG. 4, with continued reference to FIG. 3, the curved configuration of the PDT 32 generates a secondary flow 80 that aids in mixing injected fuel and air. The secondary flow 80 is transverse to a main flow direction indicated at 85 in FIG. 3. The curvature of the PDT 32 minimizes pressure loss while generating the secondary flow 80. The secondary flow 80 is generated by an inward pressure gradient in a direction toward the inner radial surface 98 opposing the centrifugal force in the main flow 85 generated by the curvature of the PDT 32 in a direction radially outward toward the outer radial surface 100. The PDT 32 secondary flow 80 moves inward under the pressure gradient and returns to the main flow 85 at an inner radial surface 98 of the PDT 32. The inner circulation induces large scale turbulence which increases flame propagation velocity by several orders of magnitude. Large deflagration flame velocity induces a rapid transition to detonation wave.

Referring to FIG. 3, the PDT 32 is disposed within a combustor housing 30 that defines an inner cavity 54. Compressed airflow 52 from the compressor impeller 38 is driven through a diffuser 34 to a distribution manifold 36. Compressed airflow 52 is also communicated into the cavity 54 and surrounds the PDT 32. The PDT 32 operates as a resonant cavity that increases the intensity of an acoustic pressure wave shown schematically at 82.

Figure 5:
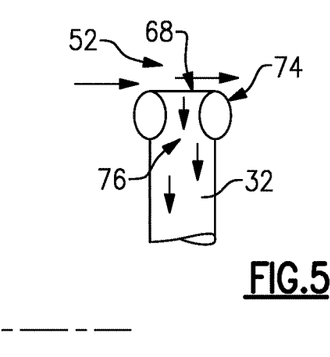
FIG. 5 is a schematic cross-section of an inlet of the example pulse detonation tube.

Referring to FIG. 5, with continued reference to FIG. 3, the compressed airflow 52 is communicated across the inlet 68. The PDT 32 is filled with airflow 52 to generate the back-and-forth oscillating acoustic pressure wave 82. A "pumping" action is realized in the PDT 32 by flowing the compressed airflow 52 across the outer rounded profile end 74. The outer rounded profile end 74 is oriented perpendicular to the direction of airflow 52 into the manifold 36. The inlet orientation perpendicular to the airflow 52 generates a pumping action of airflow in the PDT 32. The PDT 32 operates as a harmonic oscillator wherein an initial airflow across the inlet 68 enters the PDT 32 at a total pressure that is higher than the pressure surrounding the inlet 68. The pressure within the PDT 32 is a combination of the ambient static pressure and a dynamic pressure. Once the PDT 32 is filled at the pressures higher, air within the PDT 32 will act against the lower pressure of the airflow 52 and then recede. The continued oscillation in pressures at the inlet 68 generate oscillating acoustic pressure wave schematically shown at 82 within the PDT 32.

Referring to FIG. 3, ignition of a fuel air mixture is induced at the discharge end of the PDT 32. The fuel 46 is injected into the inlet 68 in a compact coherent jet to avoid premature ignition. A stoichiometric fuel/air mixture is formed due to the inner secondary flow 80 as the combustible fuel/air mixture propagates downstream toward the discharge end 70. The fuel injection cycle is tuned to the PDT resonant frequency. The time origin for the injection cycle is updated constantly by reading a pressure differential with a differential pressure sensor 66. The pressure sensor 66 provides information indicative of a pressure differential in inlet venturi 76 and a downstream location 72.

The standing acoustic pressure wave 82 moves between the inlet venturi 76 and the discharge end venturi 78. The pressure wave 82 reflects from each venturi 76, 78 and reverses direction through the PDT 32. Accordingly, the pressure wave 82 moving in a direction toward the inlet 68 reflects from the venturi 76, reverses direction and proceeds back toward the discharge end 70. The reflection of the pressure wave 82 signals the end of the cycle and is detected when the differential pressure read by the differential pressure sensor 66 is at a minimum, for example zero, due to the momentary flow reversal occurring as the pressure wave 82 reflects of the inlet venturi 76.

A controller 64 uses the pressure difference information communicated by the differential pressure sensor 66 to actuate the fuel injector 40. The controller 64 is configured and programmed to control fuel injection timing based on the reversal of the pressure wave 82, among other things. The timing and the duty cycle of the fuel injection may vary depending on desired operation to control operation. The timing is the start of the cycle and the duty cycle is how long the injection of fuel lasts as a percentage of cycle length. Both may be adjusted and varied independently to tailor operation to desired and application specific operation.

Figure 6:
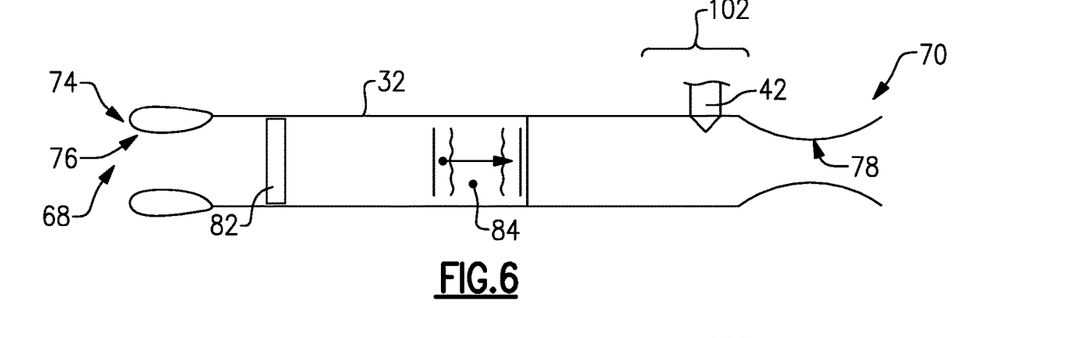
FIG. 6 is a schematic linear representation of an example pulse detonation tube at a stage of an example detonation cycle.

Referring to FIGS. 6-11 with continued reference to FIG. 3, a detonation cycle is schematically illustrated in a linear representation of the curved PDT 32. FIG. 6 illustrates the acoustic pressure wave 82 and a fuel/air mixture 84 proceeding through the PDT 32 toward the discharge end 70. The acoustic wave 82 bounces back and forth between the inlet 68 and the discharge end 70 at about the speed of sound, Mach=1 (e.g., >0.95). The fuel/air mixture 84 propagates within the PDT 32 at a slower speed of around Mach=0.3.

Figure 7:
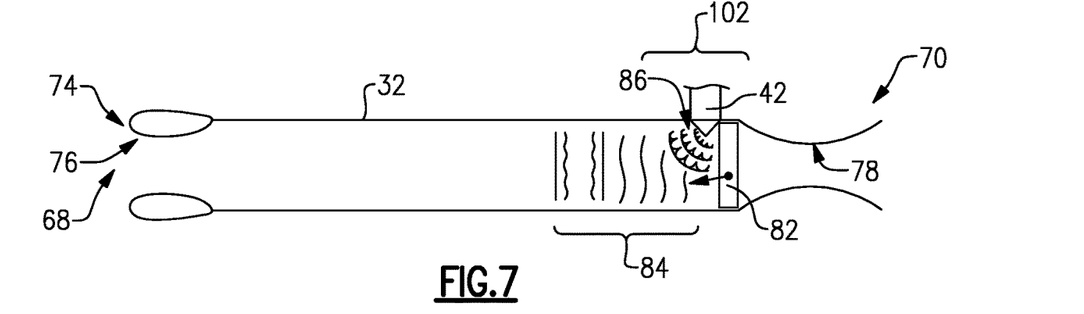
FIG. 7 is a schematic linear representation of an example pulse detonation tube at another stage of an example detonation cycle.

Referring to FIG. 7, the arrival of the fuel/air mixture 84 in an ignition zone 102 near the discharge end 70 is timed to occur prior the arrival of the acoustic wave 82. As the fuel/air mixture 84 arrives in the ignition zone 102, the igniter 42 ignites the fuel/air mixture 84 near the discharge end 70 of the PDT 32. The ignition of the fuel/air mixture 84 generates a deflagration wave 86.

Figure 8:
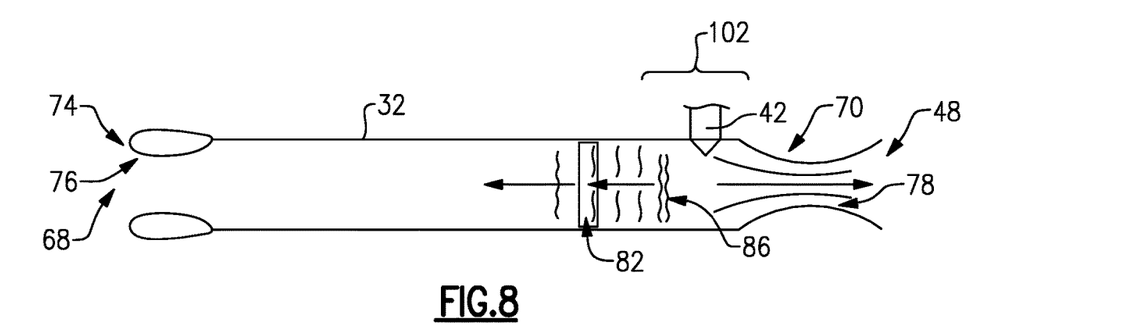
FIG. 8 is a schematic linear representation of an example pulse detonation tube at yet another stage of an example detonation cycle.

Referring to FIG. 8, the deflagration wave 86 propagates coincidental with the reflecting acoustic pressure wave 82 that has reversed direction and is proceeding back toward the inlet 68. The deflagration wave 86 amplifies pressures behind the reflected acoustic pressure wave 82. An exhaust gas flow 48 through the discharge end 70 is reduced due to lower density which provides for additional pressure build-up.

Figure 9:
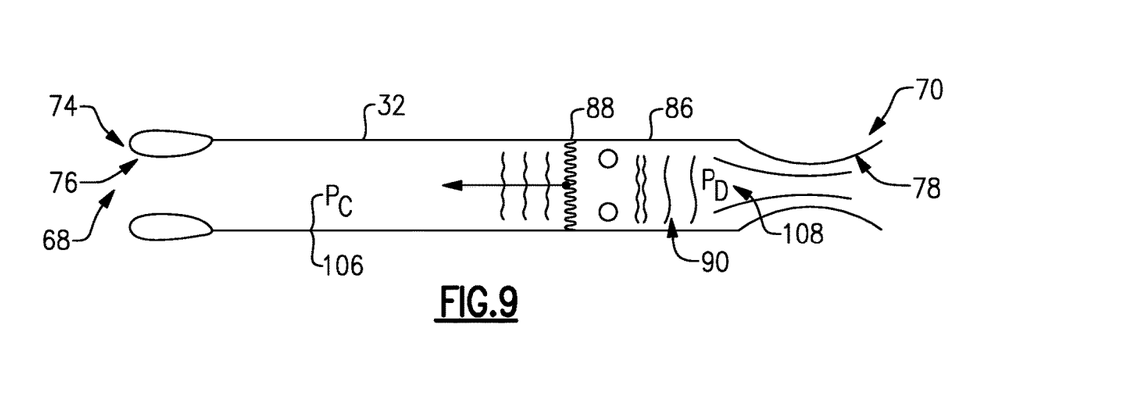
FIG. 9 is a schematic linear representation of an example pulse detonation tube at still yet another stage of an example detonation cycle.

Referring to FIG. 9, the increased intensity acoustic wave 82 translates into a detonation wave, shown schematically at 88, which in combination with the lagging yet fast deflagration wave 86 increases the combustion rate by several orders of magnitude. The pressure behind the detonation wave 88, $P_{dw}$ indicated at 108, is more than double the compressor delivery pressure, $P_c$ indicated at 106, in front of the detonation wave 88 even for relatively low propagation speeds, such as for example speeds less than Mach 1.2.

Figure 10:
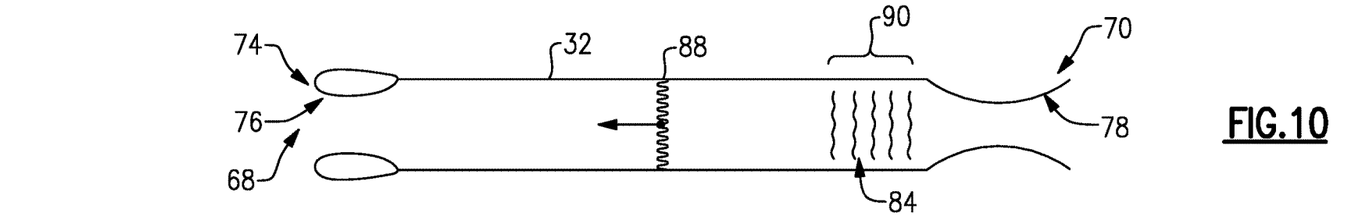
FIG. 10 is a schematic linear representation of an example pulse detonation tube at further still yet another stage of an example detonation cycle.

Referring to FIG. 10, the detonation wave 88 continues to propagate toward the inlet 68 once it exits the combustible fuel/air mixture 84 and hot gas 90. The propagation velocity drops continuously as the pressure behind the detonation wave 88 drops. The detonation wave 88 slows and eventually transforms in the high intensity acoustic pressure wave 82 as shown in FIG. 11.

Figure 11:
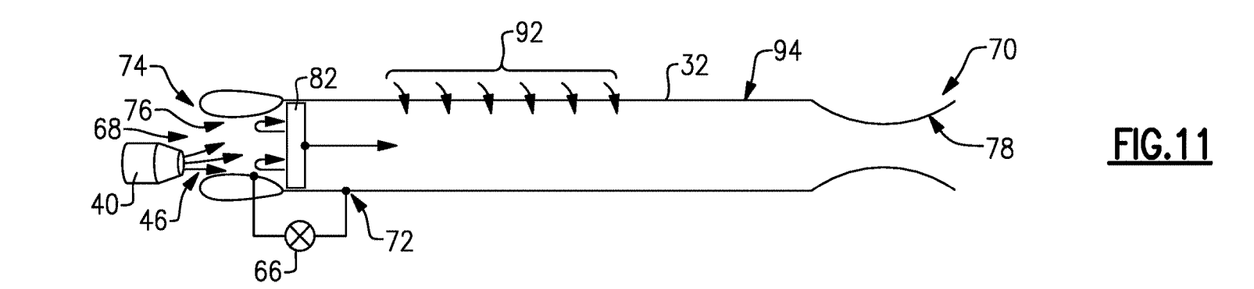
FIG. 11 is a schematic linear representation of an example pulse detonation tube at again further still another stage of an example detonation cycle.

Referring to FIG. 11, the acoustic wave 82 reflects of the inlet venturi 76 and the pulse cycle repeats. The reflection of the high intensity pressure wave 82 results in a significant drop or reversal of air flow in the venturi 76 throat. The resulting pressure differential is reduced to a zero or near zero. The zero or near zero pressure differential is utilized as a prompt to inject fuel through the inlet 68. The fuel 46 is injected at the natural frequency of the PDT 32 with a pulse width sufficient to fill a portion of the PDT 32 depending on the instant air velocity.

A passive flow of air passes through the PDT 32 between detonation cycles. The passive flow is that airflow that is not influenced by detonation of the fuel/air mixture 84. The passive flow provides for cooling of both the PDT 32 and the turbine 26.

Figure 12:
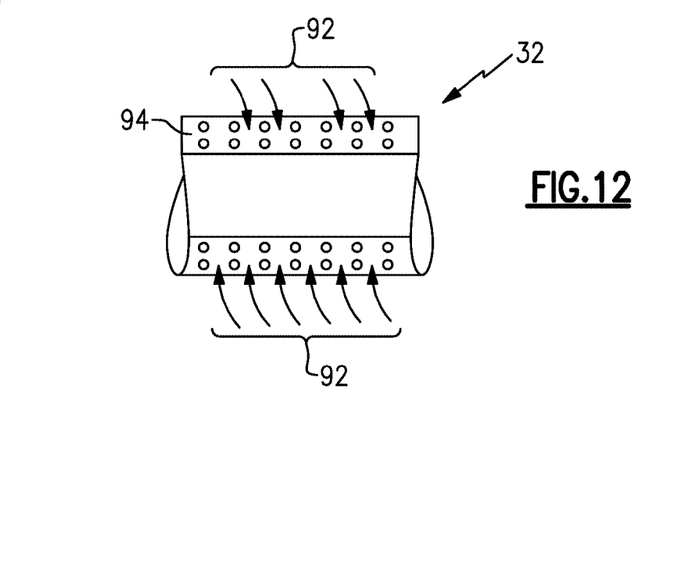
FIG. 12 is a schematic view of a portion of an example pulse detonation tube.

Referring to FIG. 12, with continued reference to FIGS. 3 and 11, the PDT 32 includes walls 94 formed from porous material. The porous material provides for air within the combustor cavity 54 to at least partially permeate the walls 94 and cool the PDT 32. Compressed airflow 52 percolates from the volume of the cavity 54 surrounding the PDT 32 into and/or through the walls 94 as indicated schematically by arrows 92. The cooling provided by the surrounding air and the porous walls 94 occurs between each detonation cycle.

Moreover, during re-charging with fuel, fuel evaporation will further cool the PDT 32 along with the cooler air that percolates through the porous wall 94. During the combustion period, flow through the porous wall 94 reverses. However, the hot gases generated within the PDT 32 have low density and high viscosity, which significantly reduces the heating enthalpy (much lower mass flow at much higher temperature) compared to the cooling enthalpy brought in by the dense, low viscosity cold air from within the combustor housing 30. The resulting average temperature of the porous wall 94 is therefore only marginally higher than the cooling air temperature. Moreover, heat it is also dissipated by conduction in the rest of the tube wall 94.

An accessory power unit assembly 20 according to an exemplary embodiment of this disclosure, among other possible things includes a compressor 22 that is coupled to an engine shaft 24 that is disposed about an engine axis, a combustor assembly 28 that is configured to generate an exhaust gas flow 48, the combustor assembly 28 includes at least one detonation tube 32 that defines a curved passage between an inlet 68 that receives a compressed airflow 52 and a discharge end 70. The combustor assembly 28 further includes at least one fuel injector 40 that is configured to inject fuel into the inlet 68, and an igniter 42 for igniting a fuel air mixture 84 within the detonation tube near the discharge end 70. A turbine 26 is coupled to the engine shaft 24 that is configured to rotate in response to the exhaust gas flow 48 that is communicated from the combustor assembly 28.

In a further embodiment of the foregoing, the accessory power unit assembly further includes an inlet manifold 36 that directs compressed airflow 52 across the inlet 68 of the detonation tube 32.

In a further embodiment of any of the foregoing accessory power unit assemblies, the inlet 68 includes an outer rounded cross-section and an inner converging/diverging cross-section.

In a further embodiment of any of the foregoing accessory power unit assemblies, the discharge end 70 includes a converging/diverging cross-sectional shape.

In a further embodiment of any of the foregoing accessory power unit assemblies, the detonation tube 32 includes an inner diameter 58 and is curved between the inlet 68 and the discharge end 70 is at a radius between two and five times the inner diameter 58.

In a further embodiment of any of the foregoing accessory power unit assemblies, the detonation tube 32 is at least partially porous and is disposed within a cavity 54 that is defined by the combustor case such that a cooling air at least partially permeates into the porous detonation tube 32.

In a further embodiment of any of the foregoing, the accessory power unit assembly includes a differential pressure sensor 66 that is configured to measure a pressure difference within the inlet 68 and a downstream location 72. The fuel injector 40 is configured to inject fuel through the inlet 68 based on the pressure difference.

In a further embodiment of any of the foregoing accessory power unit assemblies, the detonation tube 32 is configured to generate a standing pressure wave 82 between the inlet 68 and the discharge end 70 and the fuel injector 40 is configured to inject fuel through the inlet 68 in response to the pressure difference between the inlet 68 and the downstream location 72 that indicates a momentary reversal of the standing pressure wave 82.

In a further embodiment of any of the foregoing accessory power unit assemblies, the at least one detonation tube 32 includes at least three detonation tubes that are arranged circumferentially about the engine axis. The discharge end 70 of each of the detonation tubes is arranged to discharge the exhaust gas flow 48 tangentially into the turbine 26.

In a further embodiment of any of the foregoing accessory power unit assemblies, the at least three detonation tubes are operated sequentially.

A gas turbine engine according to another exemplary embodiment of this disclosure, among other possible things includes a compressor 22 that is coupled to an engine shaft 24 that is disposed about an engine axis, a diffuser 34 that receives compressed airflow 52 from the compressor 22, and a distribution manifold 36 that receives the compressed airflow 52 from the diffuser 34. A combustor assembly 28 includes at least three detonation tubes, each of the detonation tubes define a curved passage between an inlet 68 and a discharge end 70, the inlet 68 includes an outer rounded cross-section and an inner converging/diverging venturi 74,76 and is orientated transverse to an inlet flow of air such that air flows across the inlet 68, a fuel injector 40 that is configured to inject fuel into the inlet 68, and an igniter 42 for igniting a fuel air mixture 84 within the detonation tube near the discharge end 70. A turbine 26 is coupled to the engine shaft 24 that is configured to rotate in response to an exhaust gas flow 48 that is communicated from the combustor assembly 28.

In a further embodiment of the foregoing gas turbine engine, the detonation tube includes an inner diameter 58 and the curve between the inlet 68 and the discharge end 70 is at a radius between two and five times the inner diameter 58.

In a further embodiment of any of the foregoing gas turbine engines, the detonation tube 32 is at least partially porous and is disposed within a cavity 54 that is defined by the combustor case such that a cooling air at least partially permeates into the porous detonation tube 32.

In a further embodiment of any of the foregoing, the gas turbine engine includes a differential pressure sensor 66 that is configured to measure a pressure difference within the inlet 68 and a downstream location 72. The fuel injector 40 is configured to inject fuel through the inlet 68 based on the pressure difference.

In a further embodiment of any of the foregoing gas turbine engines, the detonation tube 32 is configured to generate a standing pressure wave 82 between the inlet 68 and the discharge end 70 and the fuel injector 40 is configured to inject fuel through the inlet 68 in response to the pressure difference between the inlet 68 and the downstream location 72 that indicates a momentary reversal of the standing pressure wave 82.

In a further embodiment of any of the foregoing gas turbine engines, the turbine 26 is a radial turbine that includes a radial inlet 25 and an axial outlet 27.

A method of operating an auxiliary power unit assembly according to another exemplary embodiment of this disclosure, among other possible things includes generating a standing pressure wave 82 between an inlet 68 and discharge end 70 of a curved detonation tube, measuring a pressure differential between the inlet 68 and a downstream location 72, injecting a quantity of fuel through the inlet 68 in response to the measured pressure differential indicating a reversal of the standing pressure wave 82 toward the discharge end 70, igniting a fuel air mixture 84 with an igniter 42 upon reaching a location proximate the discharge end 70, and discharging an exhaust gas flow 48 through the discharge end 70 to drive a turbine 26.

In a further embodiment of the foregoing, the method further includes communicating an inlet flow of compressed air from a compressor section across the inlet 68.

In a further embodiment of any of the foregoing, the method further includes configuring the detonation tube 32 to have a radius of curvature that is between two and five times an inner diameter 58 of the detonation tube 32 and generating a secondary flow pattern that is transverse to the standing pressure wave 82 with the curved detonation tube 32.

In a further embodiment of any of the foregoing, the method further includes configuring the detonation tube 32 from a porous material and cooling the detonation tube 32 by providing cooling air to permeate the porous material.

Accordingly, example disclosed combustor assembly utilizing PDTs provides improved operational performance and efficiencies while maintaining simple construction and operation.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An accessory power unit assembly comprising:
   a compressor coupled to an engine shaft disposed about an engine axis;
   a combustor assembly configured to generate an exhaust gas flow, the combustor assembly including at least one fixed detonation tube defining a curved passage between an inlet receiving a compressed airflow and a discharge end, wherein the inlet to the curved passage is disposed radially outward of the discharge end and the combustor assembly further includes at least one fuel injector configured to inject fuel into the inlet, wherein the at least one fixed detonation tube is configured to generate a standing pressure wave between the inlet and the discharge end and the curved passage has a length along a curvature that is ½ a wavelength of the standing pressure wave;
   a differential pressure sensor configured to measure a pressure difference within the inlet and a downstream location, wherein the fuel injector is configured to inject fuel through the inlet based on the pressure difference and the discharge end and the fuel injector is configured to inject fuel through the inlet in response to a pressure difference between the inlet and the downstream location indicating a momentary reversal of the standing pressure wave;
   an igniter for igniting a fuel air mixture within the detonation tube near the discharge end; and
   a turbine coupled to the engine shaft configured to rotate in response to the exhaust gas flow communicated from the combustor assembly.

2. The accessory power unit assembly as recited in claim 1, further comprising an inlet manifold directing compressed airflow across the inlet of the detonation tube.

3. The accessory power unit assembly as recited in claim 1, wherein the inlet comprises an outer rounded cross-section and an inner converging/diverging cross-section.

4. The accessory power unit assembly as recited in claim 3, wherein the discharge end comprises a converging/diverging cross-sectional shape.

5. The accessory power unit assembly as recited in claim 1, wherein the curved passage of the detonation tube includes an inner diameter and the curved passage between the inlet and the discharge end is curved along a radius that is between two and five times the inner diameter.

6. The accessory power unit assembly as recited in claim 1, wherein the detonation tube is at least partially porous and is disposed within a cavity defined by the combustor case such that a cooling air at least partially permeates into the porous detonation tube.

7. The accessory power unit assembly as recited in claim 1, wherein the at least one detonation tube includes at least three detonation tubes arranged circumferentially about the engine axis, wherein the discharge end of each of the detonation tubes is arranged to discharge the exhaust gas flow tangentially into the turbine.

8. The accessory power unit assembly as recited in claim 7, wherein the at least three detonation tubes are operated sequentially.

9. A gas turbine engine comprising:
a compressor coupled to an engine shaft disposed about an engine axis;
a diffuser receiving compressed airflow from the compressor;
a distribution manifold receiving the compressed airflow from the diffuser;
a combustor assembly including:
at least three detonation tubes, wherein each of the detonation tubes define a curved passage between an inlet and a discharge end, wherein the inlet includes an outer rounded cross-section and an inner converging/diverging venturi and is orientated transverse to an inlet flow of air such that air flows across the inlet, wherein each of the three detonation tubes comprise an inner diameter and a curve of each of the detonation tubes between the inlet and the discharge end is at a radius that is between two and five times the inner diameter for minimizing pressure losses and generating a secondary flow that is transverse to a main flow direction through the curved passage;
a fuel injector configured to inject fuel into the inlet; and
an igniter for igniting a fuel air mixture within the detonation tube near the discharge end; and
a turbine coupled to the engine shaft configured to rotate in response to an exhaust gas flow communicated from the combustor assembly.

10. The gas turbine engine as recited in claim 9, wherein the detonation tube includes an inner diameter and the curve between the inlet and the discharge end is at a radius between two and five times the inner diameter.

11. The gas turbine engine as recited in claim 9, wherein the detonation tube is at least partially porous and is disposed within a cavity defined by the combustor case such that a cooling air at least partially permeates into the porous detonation tube.

12. The gas turbine engine as recited in claim 9, including a differential pressure sensor configured to measure a pressure difference within the inlet and a downstream location, wherein the fuel injector is configured to inject fuel through the inlet based on the pressure difference.

13. The gas turbine engine as recited in claim 12, wherein the detonation tube is configured to generate a standing pressure wave between the inlet and the discharge end and the fuel injector is configured to inject fuel through the inlet in response to the pressure difference between the inlet and the downstream location indicating a momentary reversal of the standing pressure wave.

14. The gas turbine engine as recited in claim 13, wherein the curved passage has a length along a curvature that is ½ a wavelength of the standing pressure wave between the inlet and the discharge end.

15. The gas turbine engine as recited in claim 9, wherein the turbine is a radial turbine including a radial inlet and an axial outlet.

16. The gas turbine engine as recited in claim 9, wherein the inlet of the curved passage is disposed radially outward of the discharge end.

* * * * *